US007118603B2

(12) United States Patent
Kanthimathi et al.

(10) Patent No.: US 7,118,603 B2

(45) Date of Patent: Oct. 10, 2006

(54) PROCESS FOR THE PREPARATION OF A FORMALDEHYDE-FREE SYNTHETIC TANNING AGENT

(75) Inventors: Mookandi Kanthimathi, Chennai (IN); Palanisamy Thanikaivelan, Chennai (IN); Jonnalagadda Rao, Chennai (IN); Balachandran Unni Nair, Chennai (IN); Thirumalachari Ramasami, Chennai (IN)

(73) Assignee: Council of Scientific and Industrial Research, New Delhi (IN)

( * ) Notice: Subject to any disclaimer, the term of this patent is extended or adjusted under 35 U.S.C. 154(b) by 237 days.

(21) Appl. No.: 10/618,997

(22) Filed: Jul. 14, 2003

(65) Prior Publication Data

US 2004/0052751 A1 Mar. 18, 2004

Related U.S. Application Data

(60) Provisional application No. 60/395,898, filed on Jul. 15, 2002.

(51) Int. Cl.

*C14C 1/00* (2006.01)
*C14C 1/08* (2006.01)
*C14C 3/00* (2006.01)
*C14C 9/00* (2006.01)
*C08G 4/00* (2006.01)

(52) U.S. Cl. ....................... 8/94.19; 8/94.15; 252/8.57; 528/230; 528/239

(58) Field of Classification Search ............... 252/8.57; 8/94.15, 94.19; 528/230, 239
See application file for complete search history.

(56) References Cited

U.S. PATENT DOCUMENTS 4,888,412 A * 12/1989 Ebel et al. .................. 528/230
4,961,750 A 10/1990 Christner et al. ............ 8/94.27
5,256,317 A * 10/1993 Lauton ...................... 252/8.57
5,340,365 A 8/1994 Wehling et al. .............. 8/94.18
5,425,784 A 6/1995 Denzinger et al. ........... 8/94.33
5,629,376 A * 5/1997 Sargent et al. .............. 524/745

OTHER PUBLICATIONS

Hermann B. Bolt (2003) "Genotoxicity—threshold or not? Introduction of cases of industrial chemicals", Toxicology Letters 140-141: 43-51.
Thanikaivelan et al. (2002) "A novel formaldehyde-free synthetic chrome tanning agent for pickle-less chrome tanning: comparative study on syntan versus modified basic chromium sulfate", JALCA 97: 127-136.
Suresh et al. (2001) "An improved product-process for cleaner chrome tanning in leather processing", Journal of Cleaner Production 9: 483-491.
James J. Michels (2001) "Improved measurement of formaldehyde in water-soluble polymers by high-performance liquid chromatography coupled with post-column reaction detection", Journal of Chromatography A, 914: 123-129.
Jakov Buljan (1996) "Pollution limits for discharge of tannery effluents into water bodies and sewers", World Leather 65: 33-36.
E. Heidemann (1993) "Tanning with organic macromolecules", Fundamental of Leather Manufacturing, Darmstadt: Eduard Roether KG: 396-401.
Lakshminarayana et al. (1990) "A new category of acrylic syntan for retanning chrome leather", JALCA 85: 425-430.
"Current Intelligence Bulletin 34: Formaldehyde: Evidence of Carcinogenicity", (1981) NIOSH Publication No. 81-111.
Sharphouse, J.H. (1983) Leather Technician's Handbook, Vernon Lok Ltd., London: 220-227.
Prentiss et al. (1974) "Acrylic syntans—versatile tanning materials", Presented at the VI Annual Mexican Leather Symposium, Nov. 27-30.

* cited by examiner

*Primary Examiner*—Gregory Delcotto
*Assistant Examiner*—Preeti Kumar
(74) *Attorney, Agent, or Firm*—Baker Botts L.L.P.

(57) ABSTRACT

A process for the preparation of a synthetic tanning agent is disclosed whereby multi functional polymer is polymerized with sulfonated aromatic compound, pretreated with organic ligand to form an organo-polymeric matrix, which is essentially formaldehyde-free. The product has potential application in leather industry as an eco-friendly approach to chrome tanning by eliminating the conventional pickling process and the related problem of total dissolved solids (TDS) associated with the effluent. The present invention also provides for an exhaust aid for chrome due to its multiple carboxyl groups.

16 Claims, No Drawings

PROCESS FOR THE PREPARATION OF A FORMALDEHYDE-FREE SYNTHETIC TANNING AGENT

CROSS-REFERENCE TO RELATED APPLICATIONS

This application claims priority to U.S. Provisional patent application No. 60/395,898, filed Jul. 15, 2002.

FIELD OF THE INVENTION

The present invention relates to a process for the preparation of a synthetic tanning agent. More particularly, the present invention provides a process for the preparation of a formaldehyde-free organo-polymeric substance used for tanning leather. This polymeric substance has enormous potential application as a pretanning, as well as retanning agent in leather processing industry.

BACKGROUND OF THE INVENTION

Synthetic tanning agents are conventionally prepared by the condensation of naphthalene/phenol sulphonic acid or urea with formaldehyde as reported by Sharphouse (Leather Technicians Handbook, Vernon Lock Ltd., London, 1983).

As reported by Stille and Campbell (High Polymer, 27, 14, 1972), the phenol-formaldehyde condensed product, which is essentially a low molecular weight resinous material, has always a possibility of eliminating unreacted phenol or formaldehyde, thereby posing a risk of adding to toxicity.

Denzinger et al. (U.S. Pat. No. 5,425,784) discloses the preparation of water-soluble graft polymers of monosaccharides, oligosaccharides, polysaccharides and derivatives with crotonic acid, maleic acid, maleic anhydride, fumaric acid, citraconic acid, citraconic anhydride, $C_1$–$C_8$-alkyl- and hydroxyalkyl esters of acrylic acid, methacrylic acid or crotonic acid, mono- and di-$C_1$–$C_8$-alkyl and -hydroxyalkyl esters of maleic acid, fumaric acid and citraconic acid, acrylamide, methacrylamide, methacrolein, acrylamido-methylphropanesulfonic acid, N-vinylimidazole and mixtures. These compounds can be used as tanning agents for the self-tanning, pretanning, simultaneous tanning and retanning of pelts and skins. However, these polymers do not produce leathers having fine grain, good fullness, affordable heat stability and uniform color.

Wehling et al (U.S. Pat. No. 5,340,365) discloses the use of naphthalene sulphonic acid condensate in the production of chrome leathers. They have reported that this condensation product can be used for pretreatment of delimed and bated pelts. Although the properties of the chrome tanned leathers produced using naphthalene sulphonic acid condensate do not differ from those of conventionally chrome tanned leathers, the condensed product was prepared using formaldehyde. The condensed product may undergo photo-oxidation and release formaldehyde which may pose occupational hazards (Suspected carcinogens: A sub life of the National Institute for Occupational Safety and Health (NIOSH) substances list, $2^{nd}$ ed. Washington D.C.: U.S. Dept of Health, Education and Welfare NIOSH, 1976). Moreover, the developed chrome tanning method is associated with release of chromium in the effluent beyond the stipulated limit (2 ppm as Cr) as reported by Buljan (World Leather, November, 65, 1996).

Although the phenols and phenolic acid resins based on formaldehyde condensation have exhibited a certain amount of freedom of choice with respect to degree of crosslinking, molecular weight, particle size, etc. there are several limitations related to the use of these polymeric condensates. These agents considerably lighten the color of the leather. Addition of large amounts of the agents lead to a rubber-like handle of the leather. The tanned leathers obtained using these agents undergo photo-oxidation due to the presence of active methylene bridges. Slow release of formaldehyde from the tanned leathers may also pose hazardous environmental risks.

Current chrome tanning methods pose severe problems arising from associated environmental problems. Industry has taken great pains to improve the chromium exhaustion. Prentiss and Sigafoos reported that the use of poly acrylic and poly methacrylic acids in chrome tanning improves the chrome exhaustion (Journal of American Leather Chemists Association, 70, 481, 1975). In addition, Lakshminarayana et al. disclosed an acrylic acid based syntan as retanning agent for chrome tanned leathers, which is prepared by the graft co-polymerization of acrylic ester and methacrylic acid onto a mixture of sulfated fish oil and alginic acid using free radical polymerization (Journal of the American Leather Chemists Association, 85, 425, 1990). However, the major limitation associated with the acrylic system is that it leads to poor light fastness and heat resistance. Moreover, the acrylic syntans, which are generally attached to the protein through weak linkage, result in either low exhaustion in the processing bath or more leaching out during subsequent wet operations.

Christner et al (U.S. Pat. No. 4,961,750) have reported the preparation of thio-containing chromium polyacrylate tanning agents by complexing the chromium ion and an acrylate polymer together with a heterocycle containing nitrogen, oxygen, or sulfur atom, having a molecular weight between 200 and 30,000, which can be offered to pickled skins or hides. The main disadvantage of the tanning agent disclosed by Christner et al. is the slow release of oxides of sulphur, which are carcinogenic.

The above limitations have prompted the possibility of incorporating metal ion onto a polymeric matrix to form a complex for use as tanning salt. Since formaldehyde produces a known toxic hazard, attempts have been made to prepare a formaldehyde-free synthetic tanning agent (Suresh et al. Journal of Cleaner Production, 9, 483, 2001). Thanikaivelan et al. demonstrated the use of a synthetic tanning agent based on complexation of chromium with acrylic polymer and sulfonated aromatic condensates in the presence of organic ligands for self-tanning of delimed pelts and retanning applications (Journal of American Leather Chemists Association, 97, 127, 2002). The disclosed product resulted in improved exhaustion of chromium when applied on delimed pelts and reduced the total dissolved solids in the effluent. The major limiting feature associated with the syntan taught by Thanikaivelan et al. involves the use of chromium salt for complexation, which is toxic due to the presence of chrome.

Thus, there is a need for the development of a synthetic tanning agent that does not produce toxic effects. The tanning agent must be eco-friendly and safe for workers. Furthermore, the tanning agent should minimize the use of toxic substances, such as formaldehyde and chromium.

SUMMARY OF THE INVENTION

The present invention relates to a process for the preparation of a formaldehyde-free synthetic tanning agent.

The present invention provides for a chromium exhaust aid, which can be offered to delimed pelts along with commercial basic chromium sulfate (BCS). The conventional pickling process is avoided and the total dissolved solids in the effluent are reproduced.

The present invention also provides for a process for preparing a formaldehyde-free polymeric network, which helps in the prevention of precipitation of chromium at lower pH values.

In addition, the present invention provides for a polymeric product, which can be used as a retanning agent and provides leathers with improved fullness, grain firmness with uniform dyeing.

The present invention also provides for the tanning agent obtained using the disclosed process and leather products obtained using the tanning agent.

DETAILED DESCRIPTION OF THE INVENTION

The present invention provides a process for the preparation of synthetic organo-polymeric tanning agent essentially free from formaldehyde used for tanning leather, said process comprising the steps of:

(a) reacting an aromatic compound with sulfuric acid at a temperature in the range of 40 to 60° C. to obtain sulfonized aromatic compound;

(a) adding one or more organic ligands to the sulfonized aromatic compound to obtain a mixture;

(c) heating the mixture at a temperature in the range of 60 to 80° C.;

(d) adding one or more multi-functional polymers to the mixture of step (c);

(e) heating mixture of step (d) at a temperature in the range of 40 to 100° C. to obtain a reaction mixture;

(f) adding water to the reaction mixture to obtain a pH of between 3.0 to 3.5;

(g) optionally, aerating the reaction mixture; and (h) optionally drying the reaction mixture to obtain the synthetic organo-polymeric tanning agent.

In an embodiment of the present invention, the aromatic compound used contains 1–14 carbon atoms. The aromatic compound is reacted with sulfuric acid for a time period in the range of 50 to 250 minutes. 1 to 5 moles of sulfuric acid may be used per mole of aromatic compound. The aromatic compound may be selected from the group consisting of naphthene, anthracene, and phenol.

In another embodiment of the present invention, the organic ligand used is selected from the group consisting of formic acid, citric acid, phthalic acid, salicylic acid, oxalic acid, their sodium slats, and mixtures thereof. 0.01 to 0.1 mole of organic ligand may be used per mole of the aromatic compound.

In another embodiment of the present invention, the multi-functional polymer may be selected from the group consisting of polyacrylic acid, methacrylic acid and mixtures thereof. 0.001 to 0.01 mole of multi-functional polymer may be used per mole of the aromatic compound.

In another embodiment of the present invention, 5 to 25 moles of water per mole of aromatic compound may be added to the reaction mixture to adjust the pH. The pH of the reaction mixture may be adjusted by adding sodium bicarbonate or by sodium hydroxide solution.

In another embodiment of the present invention, the reaction mixture is aerated by passing air/inert gas through the same. The reaction mixture may be aerated for the time period in the range of 30 to 60 minute.

In another embodiment of the present invention, the reaction mixture may be dried at temperature in the range of 130 to 260° C. The reaction mixture may be dried either by drum drying or by spray drying.

In still embodiment of the present invention, the synthetic organo-polymeric tanning agent obtained has chromium exhaust in the range of 90 to 99%.

The process of the present invention is described below in detail.

An aromatic compound having up to 14 carbon atoms is sulfonated by a known method using 1–5 moles sulfuric acid per mole of aromatic compound for a period of not less than 90 min at a temperature in the range of 40–160° C. The temperature of the reaction mass is then adjusted in the range of 60–80° C. and an aqueous mixture of 0.01–0.1 mole of organic ligand per mole of aromatic compound is added.

0.0001–0.01 mole of multi functional polymer per mole of aromatic compound is then added to the said reaction mixture. Heating is allowed to continue for a period not less than 60 minutes at a temperature in the range of 60–80° C. The pH of the resulting mixture is then adjusted at a range of 3.0–3.5 by known method to obtain the synthetic tanning agent is slurry form.

The above slurry is subjected, as optional step, to aeration for a period of 30–60 minutes followed by conventional drying at a temperature in the range of 130–260° C. to obtain the synthetic tanning agent in powder form.

The novelty and non-obviousness of the present invention lies in polymerizing the multi functional polymer with sulfonated aromatic compound, pretreated with organic ligand, thereby forming an organo-polymeric matrix, free form formaldehyde, having potential application in leather industry for not only ensuring an eco-friendly approach in chrome tanning. The conventional picking process and the related problem of total dissolved solids (TDS) associated with the effluent is eliminated. An exhaust aid for chrome due to its multiple carboxyl groups is also provided, thereby ensuring an economical eco-benign approach for leather tanning.

EXAMPLES

The invention is described in detail in the following examples, which are provided by way of illustrations only and therefore should not be construed to limit the scope of the present invention.

Example 1

500 gm of naphthalene and 771 ml of concentrated sulfuric acid were taken into a 2 liter round bottom flask fitted with a stirrer. The contents of the flask were heated for 180 minutes at 40° C. with constant stirring. A drop of the resulting mass was taken in a beaker and 2 ml of water was added to the beaker with shaking. A clear solution, without free naphthalene smell was obtained. This confirms the completion of sulfonation. The sulfonated mass was transferred to a reactor fitted with a thermometer, stirrer and a dropping funnel. The mass stirred continuously for a period of 10 min while maintaining the temperature of 60° C. A mixture of 14 gm sodium citrate, 17 gm phthalic acid, 11 gm sodium formate in 70 ml of water was added to the above sulfonated mass and stirring was continued at 60° C.

40 gm of polyacrylic acid was added to the sulphonic acid mixture and the mixture was heated to 80° C. for 1 hour. A small portion of the reaction mixture was taken in a beaker and 2 ml water was added to the mass. The pH of the solution in the beaker was adjusted to 3.5 and a clear solution was obtained indicating the completion of the reaction. About 1400 ml of water was added to the mass and transferred to a bucket after cooling the reaction mass to room temperature. The pH of the mass was raised to 3.5 by adding a solution of 140 gm of sodium hydroxide in 350 ml water, followed by the addition of an aqueous solution of 350 gm of sodium bicarbonate in 700 ml water. The slurry was filtered using a cloth of pore size 5–10 μm. The filtrate was drum dried at 130° C. and the white powder was stored in a plastic container.

The product was offered to delimed goatskins at an offer of 1.5% along with 5% basic chromium sulfate (BCS) at a float of 20%. The drum was run for 1 hr and 80% water was added. Running was continued for another 1 hr and the penetration was assessed by checking uniform blue color along the cut section. The pH of the solution and the cut section was found to be 4.2. The bath was drained and the wet blue leathers were piled. On the next day, the leathers were post-tanned using a conventional upper leather-processing recipe. The chromium exhaustion of the spent tan liquor was found to be 94%. The fullness of the crust leathers was found to be superior to that of conventional chrome tanned leathers.

Example 2

534 gm of anthracene and 326 ml of concentrated sulfuric acid were taken in a 2 liter round bottom flask fitted with a stirrer. The contents of the flask were heated to 140° C. for 90 minutes with continuous stirring. 1 ml of the mass was taken in a beaker and 3 ml water was added with shaking. It was observed to form a clear solution without free naphthalene smell, confirming the completion of sulfonation. The sulfonated mass was transferred to a reactor fitted with a thermometer, stirrer and a dropping funnel. The mass was stirred continuously for a period of 10 min. while maintaining the temperature at 80° C. A mixture of 5.4 gm oxalic acid, 4.14 gm salicylic acid and 10 gm phthalic acid dissolved in 50 ml water was added to the above sulfonated mass and stirring was continued at 80° C.

1.5 gm of polymethacrylic acid was added to the sulphonic acid mixture and the mixture was heated to 80° C. for 1 hour. A small portion of the reaction mixture was taken in a beaker and 2 ml water was added to the mass. The pH of the solution in the beaker was adjusted to 3 and a clear solution was obtained indicating the completion of the reaction. About 540 ml of water was added to the mass and transferred to a bucket after cooling the reaction mass to room temperature. The pH of the mass was raised to 3 by adding a solution of 220 gm of sodium hydroxide in 500 ml water, followed by the addition of an aqueous solution of 200 gm of sodium carbonate in 400 ml water. The slurry was aerated for 45 minutes conventionally and filtered using a cloth of pore size 5–10 μm. The filtrate was spray dried at 260° C. and the white powder was stored in a plastic container.

The prepared syntan was added to the delimed sheepskins at an offer of 1.0% along with 5% BCS at a float of 20%. The drum was run for 1 hr and 80% water was added. Running was continued for another 1 hr and the penetration was assessed by checking uniform blue color along the cut section. The pH of the solution and the cut section was found to be 4.4. The bath was drained and the wet blue leathers were piled. On the next day, the leathers was post-tanned using a conventional garment leather processing recipe. The chromium exhaustion of the spent tan liquor was found to be 95%. The fullness of the crust leathers was found to be superior to that of conventional chrome tanned leathers.

Example 3

94 gm of phenol and 54 ml of concentrated sulfuric acid were taken in a 250 ml round bottom flask fitted with a stirrer. The contents of the flask were heated to 80° C. for 100 minutes with continuous stirring. 1 ml of the resulting mass was taken in a beaker and 3 ml water was added. On shaking, a clear solution was obtained confirming the completion of sulfonation. The sulfonated mass was transferred to a reactor fitted with a thermometer, stirrer and a dropping funnel. The mass was stirred continuously for a period of 10 min while maintaining the temperature at 80° C. A mixture of 1.1 gm citric acid, 0.28 gm salicylic acid and 0.56 gm sodium phthalate dissolved in 10 ml of water was added to the above sulfonated mass and stirring was continued at 70° C.

20 gm of polyacrylic acid was added to the sulphonic acid mixture and the mixture was heated to 70° C. for 1 hour. A small portion of the reaction mixture was taken in a beaker and 2 ml water was added to the mass. The pH of the solution in the beaker was adjusted to 3.5 and a clear solution was obtained indicating the completion of the reaction. About 90 ml of water was added to the mass and transferred to a bucket after cooling the reaction mass to room temperature. The pH of the mass was raised to 3.5 by adding a solution of 40 gm of sodium carbonate dissolved in 100 ml water, followed by the addition of a solution of 20 gm sodium bicarbonate dissolved in 50 ml water. The slurry was filtered using a cloth of pore size 5–10 μm. The filtrate was spray dried at 260° C. and the white powder was stored in a plastic container.

The product was offered to delimed cow sides at an offer of 1.5% along with 8% BCS at a float of 20%. the drum was run for 2 hrs and 80% water was added. Running was continued for another 4 hrs and the penetration was assessed by checking uniform blue color along the cut section. The pH of the solution and the cut section was found to be 4.0. The bath was drained and the wet blue leathers were piled. On the next day, the leathers were post-tanned using a conventional upper leather processing recipe. The chromium exhaustion of the spent tan liquor was found to be 92%. The fullness of the crust leathers was found to be superior to that of conventional chrome tanned leathers.

Example 4

256 gm of naphthalene and 544 ml of concentrated sulfuric acid were taken in a 2 liter round bottom flask fitted with a stirrer. The contents of the flask were heated to 160° C. for 90 minutes. 1 ml of the resulting mass was taken in a beaker and 2 ml water was added to the mass with shaking. It was observed that the solution was clear indicating the completion of sulfonation. The sulfonated mass was transferred to a reaction fitted with a thermometer, stirrer and a dropping funnel. The mass was stirred continuously for a period of 10 min. while maintaining the temperature at 80° C. A mixture of 8.4 gm citric acid, 16.6 gm phthalic acid and 4 gm sodium formate dissolved in 50 ml water was added to the above sulfonated mass and stirring was continued at 80° C.

A mixture of 20 gm of polymethacrylic acid and 5 gm polyacrylic acid was added to the sulphonic acid mixture and the mixture was heated to 60° C. for 1 hour. A small portion of the reaction mixture was taken in a beaker and 2 ml water was added to the mass. The pH of the solution in the beaker was adjusted to 3.5 and a clear solution was obtained indicating the completion of the reaction. About 900 ml of water was added to the mass and is transferred to a bucket after cooling the reaction mass to room temperature. The pH of the mass was raised to 3.5 by adding a solution of 100 gm of sodium hydroxide dissolved in 200 ml water, followed by the addition of a solution of 300 gm sodium bicarbonate dissolved in 600 ml water. The slurry was filtered using a cloth of pore size 5–10 μm. The filtrate was drum dried at 130° C. and the white powder was stored in a plastic container.

The product was offered to delimed buff calfs at an offer of 1.5% along with 8% BCS at a float of 20%. The drum was run for 2 hrs and 80% water was added. Running was continued for another 4 hrs and the penetration was assessed by checking uniform blue color along the cut section. The pH of the solution and the cut section was found to be 4.0. The bath was drained and the wet blue leathers were piled. On the next day, the leathers were post-tanned using a conventional upper leather-processing recipe. The chromium exhaustion of the spent tan liquor was found to be 94%. The fullness of the crust leathers was found to be superior to that of conventional chrome tanned leathers.

The present invention exhibits several advantages over the conventional process for chrome tanned leathers. The process is very simple and does not require any complicated and critical control measures. The starting materials are indigenously available and cheaper than the required materials for conventional tanning processes. Thus, the process of the present invention is also more cost effective.

The process of the present invention produces a polymer which is free from the hazardous elements, such as formaldehyde and chromium. Since the polymeric product is soluble in water, it can be offered along with basic chromium sulfate on delimited pelts. The process ensures no precipitation of chromium when it is offered on delimed pelts at a pH in the range of 8–8.5. The process of the present invention ensures high uptake of chromium in comparison to normal wet blue process. The polymeric product of the present invention enhances the chrome uptake and no release of formaldehyde in the tan liquor ensuring an eco-friendly and economically viable tanning process.

The polymeric product of the present invention is incorporated with aromatic sulphonic acids to impart fullness to the tanned leathers. The product produces wet blue leathers with required fullness apart from serving as chrome exhaust aid.

The product can be used a co-tanning agent along with BCS and as a retanning agent.

The shelf life of the product is about 1.5–2 years.

The tanned leathers do not undergo photo-oxidation since it does not contain any active methylene groups in the system unlike in other condensed tanning agents.

We claim:

1. A process for the preparation of synthetic organo-polymeric tanning agent used for tanning leather, said process comprising the steps of:

(a) reacting an aromatic compound with sulfuric acid at a temperature in the range of 40 to 60° C. to obtain a sulfonized aromatic compound;

(b) adding one or more organic ligands to the sulfonized aromatic compound of step (a) to obtain a mixture;

(c) heating the mixture at a temperature in the range of 60 to 80° C.;

(d) adding one or more multi-functional polymers to the mixture of step (c);

(e) heating the mixture of step (d) at a temperature in the range of 40 to 100° C. to obtain a reaction mixture to form an organo polymeric matrix comprising sulfonized aromatic compound polymerized to the multi-functional polymer or polymers and wherein the organo-polymeric matrix does not comprise formaldehyde;

(f) adding water to the reaction mixture to obtain a pH of between 3.0 to 3.5;

(g) optionally, drying the reaction mixture to obtain the synthetic organo-polymeric tanning agent.

2. The process according to claim 1, wherein the aromatic compound comprises 1–14 carbon atoms.

3. The process according to claim 1, wherein the aromatic compound is reacted with sulfuric acid for a time period in the range of 50 to 250 minutes.

4. The process according to claim 1, wherein sulfuric acid is in an amount of 1 to 5 moles of aromatic compound.

5. The process according to claim 1, wherein the aromatic compound is selected from the group consisting of naphthene, anthracene, and phenol.

6. The process according to claim 1, wherein the organic ligand is selected from the group consisting of formic acid, citric acid, phthalic acid, salicylic acid, oxalic acid, their sodium salts, and mixtures thereof.

7. The process according to claim 1, wherein the organic ligand is in an amount of 0.01 to 0.1 moles per mole of the aromatic compound.

8. The process according to claim 1, wherein the multi-functional polymer is selected from the group consisting of polyacrylic acid, methacrylic acid, and mixtures thereof.

9. The process according to claim 1, wherein the multi-functional polymer is in an amount of 0.001 to 0.01 moles per mole of the aromatic compound.

10. The process according to claim 1, wherein water is in an amount of 5 to 25 moles per mole of aromatic compound.

11. The process according to claim 1, wherein the pH of the reaction mixture is adjusted by adding sodium bicarbonate or by sodium hydroxide solution.

12. The process according to claim 1, wherein the reaction mixture is aerated by passing air/inert gas through the reaction mixture.

13. The process according to claim 1, wherein the reaction mixture is aerated for a time period in the range of 30 to 60 minutes.

14. The process according to claim 1, wherein the reaction mixture is dried either by drum drying or by spray drying.

15. The process according to claim 1, wherein the reaction mixture is dried at temperature in the range of 130 to 260° C.

16. The process according to claim 1, wherein the synthetic organo-polymeric tanning agent obtained, when utilized in the presence of one or more chromium salts, has chromium exhaust in the range of 90 to 99%.

* * * * *